Aug. 27, 1946.   W. P. MASON   2,406,391
COMPRESSIONAL WAVE DIRECTIONAL, PRISMATIC, AND FOCUSING SYSTEM
Filed Jan. 6, 1942   3 Sheets-Sheet 1
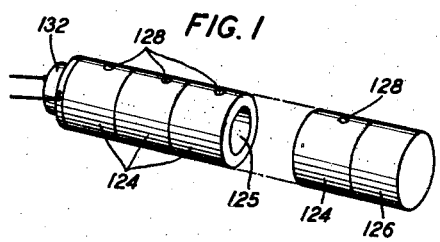
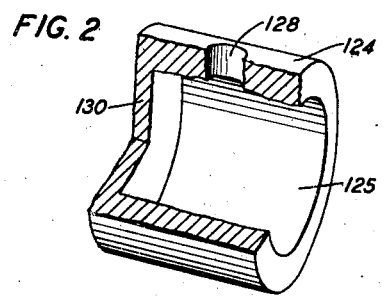
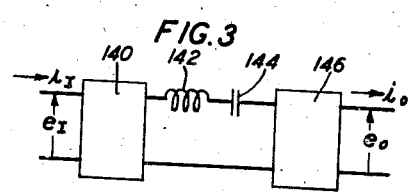
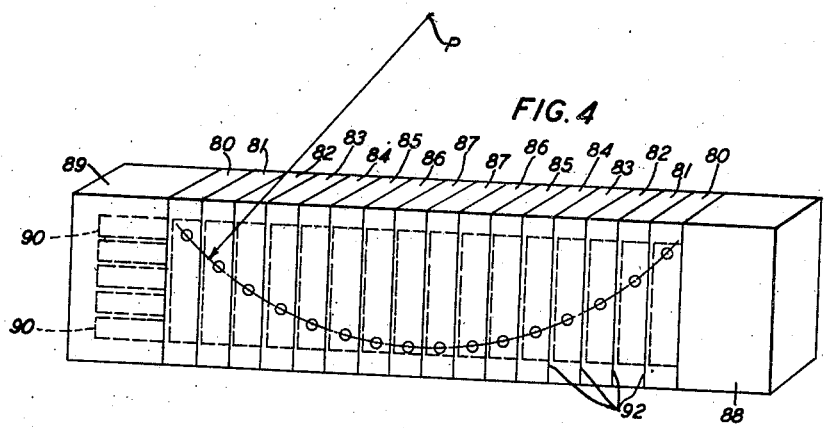
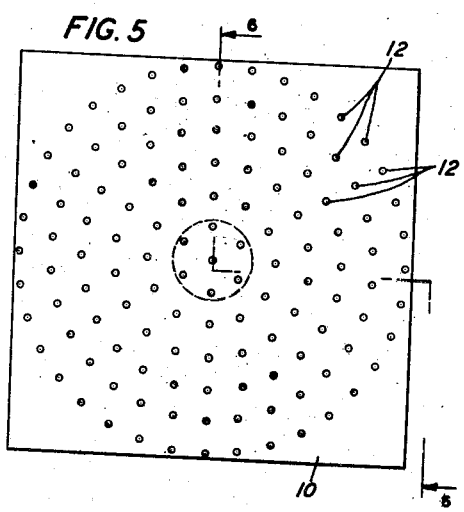
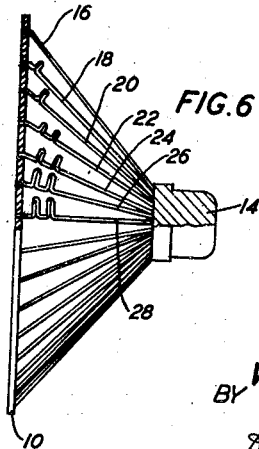
INVENTOR
W. P. MASON
BY
H. O. Wright
ATTORNEY Aug. 27, 1946.   W. P. MASON   2,406,391
COMPRESSIONAL WAVE DIRECTIONAL, PRISMATIC, AND FOCUSING SYSTEM
Filed Jan. 6, 1942   3 Sheets-Sheet 2
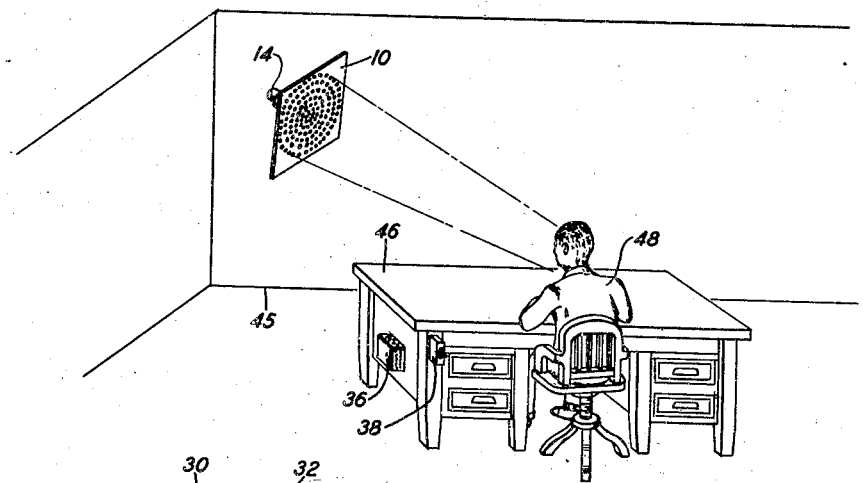
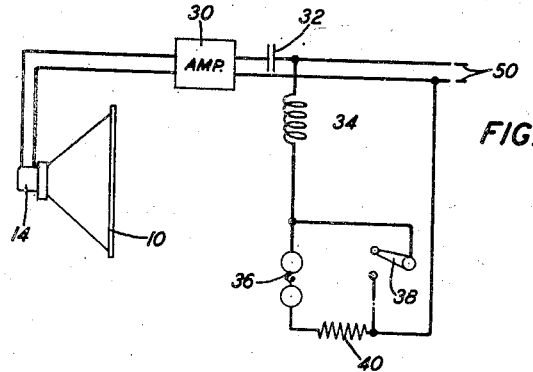
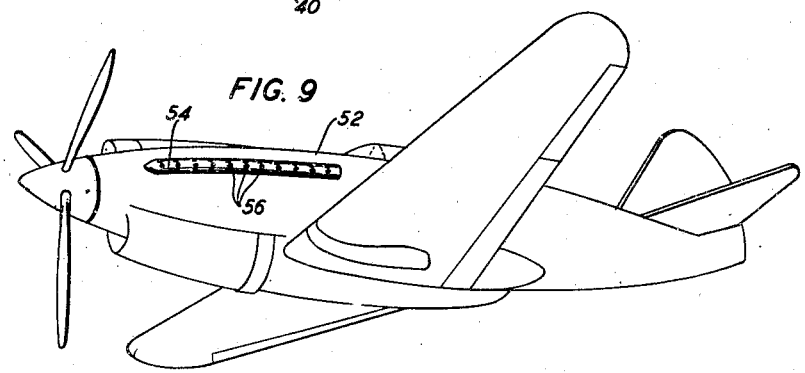
INVENTOR
W. P. MASON
BY
H. O. Wright
ATTORNEY

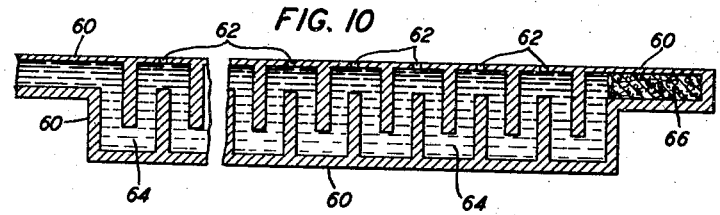
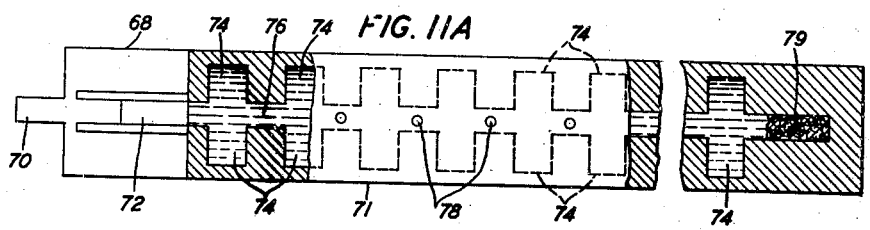
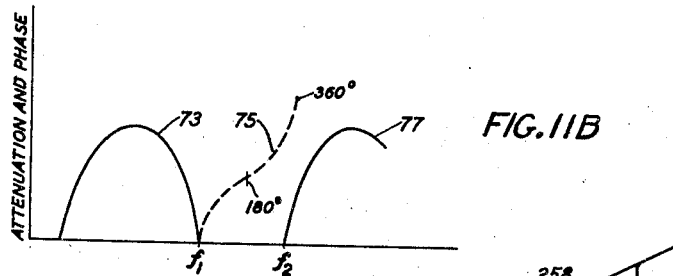
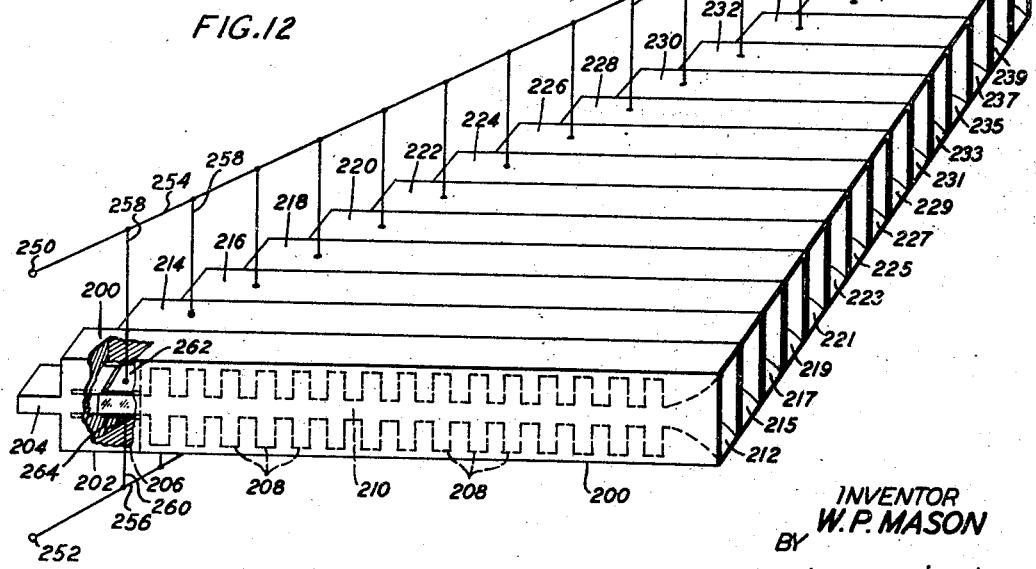

Patented Aug. 27, 1946

2,406,391

UNITED STATES PATENT OFFICE 2,406,391

COMPRESSIONAL WAVE DIRECTIONAL, PRISMATIC, AND FOCUSING SYSTEM

Warren P. Mason, West Orange, N. J., assignor to Bell Telephone Laboratories, Incorporated, New York, N. Y., a corporation of New York Application January 6, 1942, Serial No. 425,710

7 Claims. (Cl. 181—0.5)

This invention relates to improved devices for use in compressional wave transmitting and receiving systems. More particularly, it relates to improved prismatic, directional and focusing antennas, microphones, receivers and microphone receivers for use in compressional wave systems and to particular systems employing these devices.

This application is a continuation, in part, of my copending application entitled "Pipe antennas and prisms," Serial No. 381,236, filed March 1, 1941.

Objects of the invention are to provide improved compressional wave prismatic directive and focusing, radiating and receiving devices and improved systems employing these devices.

Another object is the provision of a compressional wave directive radiator which can be placed on a power plant exhaust to direct the exhaust noises in particular desired directions.

A further object is the provision of an improved telephone system in which a focusing microphone-receiver assembly may be mounted at a distance from the telephone user leaving him free to attend to other matters simultaneously with normal use of the telephone system.

Other objects will become apparent during the course of the following description and from the appended claims.

In my above-mentioned copending application, it is shown that a simple pipe having a length many times its diameter and a relatively large number of regularly spaced orifices therein, the orifices being small in relation to the pipe diameter, adjacent orifices being spaced less than a diameter apart, the pipe diameter not exceeding a few wave-lengths of the lowest frequency employed, will have pronounced directive and receiving properties, the directive angle with respect to the longitudinal axis of the pipe being dependent upon the frequency of the energy, and the device can, therefore, be employed in directional systems as a highly directive radiating and receiving device. Moreover, these directional properties can readily be made prismatic in character, that is a band of frequencies can be spread when emitted by a device of the invention, as white light is spread into the chromatic spectrum by a light prism. The prismatic character appears in the reception of energy as a selective reception, the angle being dependent upon the frequency received. That is, a particular frequency will be received with maximum amplitude only if it impinges upon the device at a particular angle.

Since one method of detecting the approach of aircraft is based upon picking up sound waves emanating from the motor exhausts, it is a feature of the invention to provide a perforated pipe compressional wave antenna for use on aircraft motor exhausts to direct the audible sound waves directly down or to the rear of the craft instead of ahead of it so that the craft cannot be so readily detected until it has at least passed beyond the listening posts. In peace-time, such devices can be employed, for example, to reduce the noise and consequent annoyance caused in residential sections by aircraft passing overhead.

The focusing microphone receiver provides a simple instrumentality for liberating the telephone subscriber from the necessity of holding telephone instruments or of constraining his head to within a relatively short distance from the telephone instruments. The focusing feature is particularly valuable in substantially eliminating side-tone and singing difficulties and reducing the effects of room noises which have heretofore rendered the combined use of sensitive microphones and loud-speaking receivers in telephone systems of this general character somewhat unsatisfactory. The particular constructions of focusing microphone receivers disclosed herein illustrate further adaptations of the general principle of obtaining pronounced directional effects by subdividing the total energy into a large number of small portions and controlling the relative phases of the portions, thereafter recombining them to realize the desired effects. The constructions here shown are simple and compact and are admirably well adapted for the intended purposes.

The principles and features of the invention will be more readily understood in connection with the following detailed description of illustrative embodiments in conjunction with the accompanying drawings, in which:

Fig. 1 shows a prismatic directional pipe antenna for compressional wave systems;

Fig. 2 shows in detail a component of the antenna of Fig. 1;

Fig. 3 indicates in diagrammatic form the equivalent electrical circuit of the pipe antenna of Fig. 1;

Fig. 4 shows a slightly different form of prismatic pipe antenna of the same general class as the antenna of Fig. 1 but with the radiating orifices arranged in an arc to produce focusing effects as distinguished from merely directional effects;

Figs. 5 and 6 show a form of focusing microphone receiver assembly particularly well adapted for use in a telephone system in which the user need not concern himself with holding apparatus or with speaking directly into a microphone;

Fig. 7 illustrates the use of a telephone system employing the device of Figs. 5 and 6;

Fig. 8 shows a schematic electrical circuit diagram suitable for a telephone system as illustrated in Fig. 7;

Fig. 9 illustrates the application of a directional type exhaust noise-directive device to a power plant for aircraft; and Figs. 10, 11A, 11B and 12 illustrate alternative forms of the prismatic compressional wave directive receiving and radiating structures of the invention.

In more detail, in Figs. 1 and 2 a simple structural arrangement for one form of prismatic compressional wave energy antenna of the invention is illustrated. This antenna consists of a pipe with transverse diaphragms and a row of intermediate orifices in the side of the pipe, regularly spaced therealong. As a matter of convenience in manufacture the pipe can be made as an assembly of a series of cup-shaped members 124, a single cup being shown in detail in Fig. 2 with a portion broken away to expose the interior. A number of cups, at least a dozen should be used for the majority of applications and more will usually be desirable, are arranged coaxially in a row with their orifices in line as shown in Fig. 1, with the bottom of one cup pressed firmly against the top or rim of the adjacent cup. The greater the number of cups employed the sharper will be the directive properties. As many as fifty will frequently be found desirable and for precise work several hundred may be required.

Any convenient clamping means which does not interfere with the driving mechanism or with the radiation or reception of energy at the orifices can be employed to clamp the cups in a row as indicated. Since any mechanic can, obviously, readily devise a suitable clamping means to meet the indicated requirements, none has been shown in Fig. 1, as it would unnecessarily complicate the drawing. Alternatively the cups may be welded or cemented together or otherwise maintained in alignment as shown in Fig. 1.

Each cup is provided with an orifice 128 to permit the radiation of an appropriately small amount of energy. (Between 2 per cent and 4 per cent of the total energy of the system will usually be radiated from each hole.) A piezo-electric crystal or similar type of driving element 132 is pressed against or cemented to the input end of the acoustic transmission line so formed. At the far end a member 126, designed in accordance with principles well known in the art to absorb any residual sound energy reaching it, is provided. The thin part, or bottom, 130 of each cup 124 vibrates in the manner of a circular plate, or diaphragm, in flexure, clamped around its periphery when a difference of pressure occurs on the two sides.

The equivalent circuit of the structure is as shown in Fig. 3. The series resonant circuit represented by inductance 142 and capacitance 144, represents the reaction of the clamped diaphragm, while the transmission lines 140, 146 represent the propagation of the compressional wave in the cup cavities. The combination can, obviously, readily be proportioned to be a band-pass filter, the dimensions and width of the pass-band of which can be adjusted and controlled by making the diaphragm thicker or thinner, as discussed hereinafter. By providing a small hole or orifices 128, Figs. 1 and 2, in each section of the filter so formed, a specified small amount of energy can be radiated from or received in each of the sections, at a particular point in each section, the point of course being in the same relative position for each section, and the operation will, obviously, be similar to that of the electromagnetic antennas and prisms described in my above-mentioned copending application filed March 1, 1941. The energy which gets through the last filter section is absorbed by a terminating resistance or energy-absorbing member 126 in order that substantially no reflections from the far end will occur.

Since such compressional wave devices are frequently employed in submarine signaling systems and it is convenient to submerge the device in water and permit the cavities to fill with water, the design must naturally be based in such cases upon the properties of the water, rather than those of air. By way of example, for a prismatic antenna of the type shown in Fig. 1, for use submerged in sea water and to operate over a band of frequencies centered about the frequency of 55 kilocycles per second, each cup should have an internal radius of .54 centimeter, an over-all length of 1.204 centimeters, and a diaphragm (bottom) .109 centimeter thick. The side walls of the cup should be at least .25 centimeter thick. These dimensions assume that the material used is brass. The orifice in each cup should be centrally located with respect to the cavity and should be approximately .25 centimeter in diameter. Such a structure will have a pass-band width of 22,000 cycles, the mid-band frequency being, as above mentioned, 55,000 cycles.

In Fig. 4, a compressional wave prismatic antenna similar to that of Fig. 1, except that it is of rectangular shape, is shown. Also, the orifices of the device of Fig. 4 are arranged along an arc the center of curvature of which arc, namely the point P, is at a distance from the device.

The device of Fig. 4 is shown as comprising 16 sections, 80, 81, 82, 83, 84, 85, 86 and 87, respectively, (the corresponding sections on opposite sides of the center of the structure being assigned the same designation numbers). For more highly directive properties from 25 to 200 or more sections can be employed, the principles of operation being substantially identical. Each of the sections of the structure of Fig. 4 is similar to the cup-like section of Fig. 2 except that it is rectangular in form. At the left end of the structure a plurality of piezoelectric crystals 90 are employed to energize the structure and at the right end a member 88 of absorbing material is provided to absorb such energy as may reach the right end of the structure.

As for the device of Fig. 1, that of Fig. 4 may be proportioned to be a multisection, confluent type, compressional wave, band-pass filter structure and at the mid-frequency of the pass-band the radiation from all orifices will be in phase and since the orifices all lie on an arc there will be one point distant from the structure at which the radiation from all the orifices will again arrive in phase, namely, the center of curvature of the arc. Expressed in other words, the device will, for the mid-frequency of its pass-band, focus its radiation on the point which is the center of curvature of the arc on which the orifices lie.

At frequencies other than the mid-band frequency the radiated energies from the several orifices will leave their respective orifices with a particular phase difference, different for each frequency, between radiations from successive orifices. The structure will again focus its total radiation, but at a different point for each frequency. The structure is, obviously, in the nature of a compressional wave lens.

Its properties as a receiver will, of course, be similar to those it possesses as a radiator and, for example, at its mid-band frequency it will respond to energy originating at its focal point P to the exclusion of energy of the same frequency, originating at points removed from the focal point. Also for each particular frequency within its pass-band the device will respond to that particular frequency when it originates at one particular point to the exclusion of the same frequency originating at points removed therefrom.

Obviously the device of Fig. 1 can be made to focus by merely curving the pipe to bring the orifices into an arc having its center at a desired focal point.

Structures similar to those of Figs. 1 and 4 described above but omitting the transverse diaphragms can also be employed. The pipe then becomes a compressional wave transmission line and the holes are spaced to obtain particular desired relative phase differences in accordance with the transmission properties of the line. A particular form of this general type of structure is shown in Fig. 10 and will be described hereinafter. The phase characteristics of the line are, of course, variable with frequency and therefore the device can be designed to provide prismatic effects though the latter will in general not be as pronounced as where the structure is modified to be a relatively narrow band-pass filter.

A second method of converting such lines into filter structures is to insert enlarged sections of pipe or short transverse sections of pipe at regular intervals in accordance with well-known acoustic filter theory. This method will be exemplified below. A particular structure illustrative of this method is shown in Fig. 11A and will be described hereinafter.

In general, for high power radiation, difficulties arising from transmission through the metal frame of the structure rather than through the fluid within the structure may be found troublesome. This is particularly so when the devices are filled with water which has an impedance in the neighborhood of $1.5 \times 10^5$ mechanical ohms per square centimeter as compared to 43 ohms for air and when the "pipe" is doubled back on itself to reduce its physical over-all length as illustrated in Fig. 11A. Difficulties resulting from cavitation, that is the formation of bubbles along the surfaces of the structure containing the power transmitting liquid, will also be found troublesome at high power levels. Cavitation usually results in an appreciable power loss and is aggravated by further increase in power. These difficulties can be overcome to a considerable extent by designing the wall structure to comprise a filter suppressing the pass-band of the hydraulic filter. In order to do this it is necessary that the metal section between side branches be a quarter wave-length at the mean frequency of the band. This requires the use of a metal having about the same velocity (for compressional wave propagation) as water. Lead is the only metal which fulfills this requirement. Because of cavitation limitations such structures will, however, still be not too well suited for high power transmission and so in general will find their greatest field of usefulness as receiving devices and as intermediate power radiators. In connection with Figs. 10 to 12, inclusive, alternative forms of radiators of this class will be discussed in more detail hereinunder.

In Figs. 5 and 6 a second application of the general method of providing directional and focusing effects by a multi-orifice compressional-wave device is illustrated. The orifices 12 in this instance are arranged in concentric circles on a common plane surface, that of member 10, and connect severally to a microphone-receiver 14, through individual tubes, such as 16, 18, 20, 22, 24, 26 and 28 of Fig. 6. The center tube 28 provides the longest path for compressional wave energy between its orifice and the microphone-receiver and the circle of outermost tubes 16 provides the shortest, the tubes of intermediate circles providing intermediate path lengths gradually approaching that of center tube 28 in proportion to their proximity thereto. The path lengths are proportioned so that at some focal point in front of the device the compressional-wave energy components originating at device 14 will, after being emitted from the tubes, again all be in phase at the focal point, that is, the device will focus on the particular focal point. A moving coil, pressure-type, Western Electric Company, 618A microphone can be employed as the microphone-receiver 14. The method of coupling the microphone-receiver to the tubes can be similar to that employed for the "Tubular directional microphone" shown in Fig. 4 of a paper by applicant and R. N. Marshall and published in The Journal of the Acoustical Society of America, vol. 10, pages 206–215, January 1939. Moving coil type receivers of the same basic construction as the 618A microphone are described in a paper by E. C. Wente and A. L. Thuras, published in the Bell System Technical Journal, vol. 7, January 1928 at page 140 and "Moving Coil Receivers and Microphones" are further discussed in a second paper by the same authors in the Bell System Technical Journal, vol. 10, October 1931 at page 565. The standard 618A microphone has been found to operate satisfactorily both as a microphone and as a receiver as required in the arrangement shown in Figs. 5 and 6. A discussion of the theory of instruments of this class together with a description of improvements in certain details of the construction which can be applied to the 618A microphone and are exemplified in a non-directional microphone, the Western Electric 630–A microphone, are given in a paper entitled "A non-directional microphone" by R. N. Marshall and F. F. Romanow, published in the Bell System Technical Journal, vol. XV, July 1936, pages 405 to 423, inclusive.

Such a device can, by way of example, be employed to advantage in a telephone system of the type illustrated in Figs. 7 and 8 in which the structure of Figs. 5 and 6 including face plate 10 and microphone-receiver 14, is indicated as being mounted on the wall of an office 45 so as to focus at the head of a man 48 seated at a desk 46. A key 38 is provided in an easily accessible position on the front of the desk 46 to be operated by the man 48 to short-circuit the calling signal bell 36 when it is desired to use the telephone system for speech. The principal object and the advantages of the arrangement are apparent. The telephone user is not inconvenienced by apparatus which he must hold or lean toward. The focus of the device 10—14, etc., should preferably be fairly broad so that ordinary changes in the position of the user's head will not carry him seriously out of the focus.

The general type of the circuit of such a telephone system is illustrated in Fig. 8 in which 50 is a telephone line or pair of conductors leading to a switchboard or central office of a telephone system, 36 and 38 are the above-mentioned call-bell and key respectively, inductance 34 and capacity 32 are a composite set directing speech and ringing currents into their proper respective channels and 30 is a two-way telephone amplifier or repeater of conventional type which may be inserted if more gain in the circuit is deemed desirable. The arrangement including members 10 and 14 is, of course, the device of Figs. 5 and 6.

In Fig. 9 an aircraft 52 is illustrated, on the side of which is an exhaust pipe 54 for the power plant of the aircraft and spaced at appropriate intervals along the exhaust pipe are orifices 56, whereby the exhaust noise from the power plant of the craft is subdivided into a relatively large number of small portions having particular phase relations such that the major portion of the sound energy will be directionally transmitted toward the rear with respect to the longitudinal axis of the plane in accordance with the principles explained above and in my copending application Serial No. 381,326 filed March 1, 1941.

As above mentioned, for military aircraft, the diversion of engine exhaust noise to the rear, or vertically, rather than ahead of the craft will render it more difficult for hostile sound detecting systems to determine that the aircraft is approaching and for civilian aircraft it may be desirable to direct the engine exhaust noise away from the ground so that it will not be a nuisance to communities over which the craft wishes to fly. Obviously, the same principles are directly applicable to numerous commercial power plants, either public service or industrial, which are located near populated areas. The exhaust noises may be, in such instances, directed upward or otherwise away from the populated areas. In wartime the noise may well be directed horizontally to make it more difficult for hostile bombing aircraft to locate the power plant. For large power plants a plurality of large pipes are usually found necessary to provide adequate exhaust capacity. The arrangements of the invention are preferable to the "exhaust mufflers" of the prior art since they permit free flow of the exhaust gases and the power consuming back pressure of the prior art devices is thereby avoided.

As previously mentioned, Figs. 10, 11A, 11B and 12 illustrate alternative forms of compressional wave directive and prismatic receiving and radiating devices of the invention.

In the device of Fig. 10 a column of a fluid is enclosed in a structure 60 which is the equivalent of a pipe folded back on itself to reduce its total physical length without reducing the effective length of the fluid column. Small orifices 62 are provided at regular intervals along a straight line on the upper surface of member 60. The effective interval between orifices 62, i. e., the distance along the folded fluid column 64, should not exceed a half wave-length of the highest frequency with which the device is to be employed. The size of the orifices 62 should be such that only a small portion (less than 5 per cent) of the total energy involved should be radiated or received by a single orifice. As explained above in connection with the device of Fig. 4 the member 60 should be made of lead if the column of fluid 64 is water so that the energy of the system will be transmitted through the fluid rather than through the frame. The right end of the member 60 contains energy absorbing material 66 to prevent reflection of the energy reaching it. A suitable absorbing material is felt and it can be permitted to become saturated with water if desired. If it is deemed preferable to employ a dry sound-absorbing material it can be enclosed by a rubber membrane to exclude moisture.

An alternative form of structure for a submarine compressional-wave prismatic type of radiator or receiver is illustrated in Fig. 11A in which a member 71 encloses a column 76 of the fluid (normally sea water) which is provided at regular intervals along its length with enlarged portions or cavities 74 and is terminated at the far (right) end with compressional-wave absorbing material 79. The general principles underlying the design of such a structure to have band-pass wave filter characteristics are explained in detail in my Patent 1,781,469, issued November 11, 1930. This type of structure is advantageous for the present purposes since the enclosing member 71 may be readily designed to suppress transmission through itself of the frequencies to be transmitted through the fluid (i. e., the member 71 is designed as a band-suppression filter which suppresses the band of frequencies to be transmitted through the fluid). In order to do this the metal sections between the side branches 74 must represent a quarter wave-length at the mean (or middle) frequency of the frequency band passed by the fluid. This requires that the compressional wave energy have a velocity in the metal approximately equal to its velocity in the fluid. For structures employing sea water as the fluid the most suitable metal is, again, lead and consequently in Fig. 11A member 71 should be of lead. The member 71 will then not transmit longitudinal compressional wave energy of the frequencies passed by the fluid.

As indicated in Fig. 11A small orifices 78 connect the fluid column within the member 71 with the medium (normally sea water) in which the structure is immersed. Orifices 78 are spaced regularly along structure 71 in a straight line, each orifice being midway between two lateral cavities 74. Each orifice 78 is proportioned to emit or receive a small portion, approximately 5 per cent or less, of the total energy emitted or received by the structure respectively.

The structure of Fig. 11A is, in a preferred form, provided with a piezoelectric crystal 72 adapted to transmit compressional wave energy to or to absorb energy from the near (left) end of the fluid column 76 depending upon whether the device is being used for transmitting or receiving, respectively. Crystal 72 is, of course, provided with electrodes and suitable means for connecting electrically thereto in accordance with the well-known practice in the art. These details are not shown in Fig. 11A as they would tend to complicate the drawing and would add nothing not well known to those skilled in the art.

Crystal 72 is, further, mounted on a steel backing block 70. The principles underlying this type of mounting for the crystal are explained in detail in connection with Fig. 14 of my copending application Serial No. 413,429, filed October 3, 1941, and entitled "Compressional wave radiators and receivers."

Briefly block 70 is proportioned to be a half wave-length long (from its left to its right end as shown in Fig. 11A) at the mid-band frequency of the pass-band of the fluid column, thus inducing a node at its center and it may therefore be supported mechanically at its center by yoke 68 without transmitting any substantial amount of energy to the yoke. Yoke 68 is attached to and assists in supporting frame 71. The right end of crystal 72 substantially closes the left end of the cavity in member 71. A thin rubber gasket, not shown, can be employed to complete a fluid tight junction between the crystal and member 71 and should of course impede the longitudinal vibration of crystal 72 to as small a degree as possible.

Fig. 11B is illustrative of the transmission and phase characteristics of a single section of the multisection compressional wave filter constituted by the fluid column 76 and the connecting cavities 74. In Fig. 11B all frequencies between a lower cut-off frequency $f_1$ and an upper cut-off frequency $f_2$ are freely transmitted. Frequencies below $f_1$ and above $f_2$ are attenuated as indicated by attenuation curves 73 and 77, respectively. For each section the phase shift is substantially zero at the lower cut-off frequency $f_1$ and increases as indicated by curve 75 until it is substantially 360 degrees at the upper cut-off frequency $f_2$.

The orifices 78 are spaced to be positioned at corresponding points of each successive section of the fluid column wave filter and hence the relative between successive portions of energy radiated from or received by the respective orifices will be a function of the particular frequency within the pass-band defined by lower cut-off frequency $f_1$ and upper cut-off frequency $f_2$ and it may be made to have any desired value between zero and 360 degrees by simply selecting the appropriate frequency at which a section of the wave filter has the desired value of phase shift.

Conversely, since the direction of radiation or reception is determined by the relative phase of the components of the compressional wave energy emitted or received, the direction of radiation or reception can be determined by selecting a particular frequency for the energy to be radiated or by observing the frequency received respectively. To obtain sufficiently sharp directive properties to be of any substantial utility a large number of filter sections and regularly spaced orifices must be employed. For the majority of uses a structure having at least a dozen wave filter sections and orifices will be required and to obtain highly directive effects several hundred wave filter sections and orifices may in some instances be found desirable.

An alternative structural arrangement embodying in a somewhat different form certain principles of the invention is illustrated in Fig. 12 in which are shown fifteen structures 200, 214, 216, 218, 220, etc., each of which is similar to that of Fig. 11A, except that it is terminated in a flared orifice, instead of in a chamber containing sound-absorbing material, as shown, and no small orifices along the member are provided. Each of these structures houses a fluid column 210, provided with side cavities 208, the column and cavities being proportioned, as for the device of Fig. 11A, to have band-pass compressional wave transmission properties. Devices 200, 214, 216, 218, 220, etc., are identical, except that device 214 has one less filter section within it than device 200, 216 has one less section than 214, 218 has one less section than 216, and 220 has one less section than 218, etc. The flared orifices 212, 215, 217, 219 and 221, etc., respectively, of these devices are aligned, as shown, the center-to-center spacing being less than half a wave-length of the highest frequency (upper cut-off) of the transmitted band of their respective filters (which are substantially identical as to pass-bands). At the respective left ends of each of the devices of Fig. 12 a piezoelectric crystal, 206 for device 200, mounted on a half wave-length backing block, 204 for device 200, is provided. Piezoelectric crystal 206 is provided with an upper electrode 262 and a lower electrode 264. Conductors 258 and 260 connect to these upper and lower electrodes, respectively. Similar leads are provided for connecting to the electrodes of the crystals in each of the filter devices whereby all the upper electrodes are connected through conductors 258 and 254 to terminal 250, and all the lower electrodes are connected through conductors 260 and 256 to terminal 252. This places all of the crystals electrically in parallel and by applying an alternating current voltage across terminals 250, 252 all the crystals can be driven in phase.

Since compressional wave energy emitted from or received by the respective crystals of devices 214, 216, 218 and 220, etc., passes through one less filter section than for the adjacent device immediately at its left (when facing the flared ends of the devices as shown in Fig. 12) the composite effect is obviously equivalent to that for the devices of Figs. 10 and 11A where the emitting orifices are spaced along the structure at corresponding points of successive filter sections.

The above arrangements are illustrative of numerous applications of the principles of the invention which may be made by those skilled in the art. The scope of the invention is defined in the following claims.

What is claimed is:

1. A prismatic directional device for radiating and receiving compressional wave energy, said device including a pipe-like structure of uniform internal diameter and of axial length exceeding its internal diameter, said structure including therein a plurality of regularly spaced transverse diaphragms, the interval between diaphragms being approximately equal to the said internal diameter, the said structure also including a plurality of regularly spaced orifices, each orifice being centrally located between two diaphragms, the said structure being designed and proportioned to be a band-pass compressional wave filter, the device including at one end of said structure a driving or energy utilizing element and at the other end an energy dissipating element which substantially matches the characteristic impedance of the structure in its pass-band whereby for each frequency within the pass-band of said device particular predetermined different directive characteristics will be realized.

2. In a compressional wave system, a prismatic radiator comprising a multisection band-pass compressional wave filter having an excess of twelve identical wave filter sections, means for introducing compressional wave energy of frequencies included within the pass-band of said filter into one end of said filter, means in each filter section comprising a small orifice for radiating from a corresponding point in each section a small portion of the energy introduced into said filter and means for absorbing substantially all energy reaching the other end of said filter whereby energy of different frequencies within the pass frequency band of the filter will be radiated in different directions.

3. In a compressional wave directional system, a structure for prismatically transmitting or receiving compressional wave energy within a particular band or spectrum of frequencies which includes a tubular member having an alignment of orifices exceeding twelve in number, spaced at approximately one half wave-length intervals, each orifice being proportioned to radiate or receive not over 10 per cent of the total emitted or received energy, said tubular member including therein a transverse diaphragm midway between each pair of successive orifices, the member and diaphragms being proportioned and spaced to comprise a band-pass compressional wave filter passing the particular band or spectrum of frequencies of interest whereby the directions of emission or reception are determined by the relative positions of the frequencies of the respective energy components with respect to the frequency pass-band of the prismatic device.

4. In a compressional wave energy system, a prismatic multisection compressional wave filter antenna, the sections of said filter having identical phase and transmission properties, each section containing a small orifice proportioned to emit or receive a small portion of the total energy to be emitted or received, the orifices being at corresponding points of the respective filter sections, the orifices being placed on an arc the center of curvature of which is at a remote predetermined distance whereby the filter may be made to focus at that distance for the transmission and reception of compressional wave energy.

5. In a compressional wave system, a radiating and receiving device comprising a compressional wave filter structure which will freely pass a predetermined frequency spectrum, said filter having a plurality of wave-filter sections of substantially identical phase-frequency characteristics, a terminal at one end of said filter structure adapted for introducing and abstracting compressional wave energy therefrom, each section of said filter structure having an orifice proportioned to radiate and receive less than ten per cent of the total energy passing through said filter structure, the orifices in all sections being positioned at substantially the same position in their respective sections whereby, within the predetermined frequency spectrum, the energy components emitted and received from successive filter sections will have different predetermined uniform phase relations for each frequency of said spectrum and the device will emit and receive each frequency of said spectrum most strongly at a predetermined angle, the angle being different for each frequency and the device may be employed as a directive radiator and receiver of compressional wave energy, the directive properties of which are, within the said frequency spectrum, predetermined by the frequency of the energy employed.

6. In a compressional wave system a radiating and receiving device comprising a compressional wave transmitting structure freely transmitting a predetermined frequency spectrum, said structure being a plurality of wave-lengths of the lowest frequency of said spectrum in length, the phase shift of said structure varying appreciably in a relatively uniform manner throughout said frequency spectrum, said structure being provided with orifices spaced uniformly along said structure at intervals of less than half a wave-length of the highest frequency of said spectrum, said orifices being proportioned to emit and receive less than ten per cent of the total energy passing through said structure, whereby for each of the frequencies within said spectrum said structure will emit and receive energy components having a particular predetermined uniform phase relation between components from successive orifices, the phase relation being different for each frequency of said spectrum and said device can be employed as a directive compressional wave radiator and receiver the directive properties of which have predetermined characteristics differing for each frequency within said spectrum.

7. A directive radiator and receiver of compressional wave energy comprising a compressional energy wave filter which freely passes a predetermined frequency spectrum, said wave filter having a main compressional wave propagating channel and having disposed at regular intervals along said main channel side branches communicating with said main channel only, said main channel being provided with regularly spaced orifices, each of said orifices being proportioned to radiate or receive an energy component which is small with respect to the total energy passing through said filter, each said orifice being positioned midway between two points at which consecutive side branches communicate with said main channel whereby throughout the said frequency spectrum said device will radiate or receive compressional wave energy of a particular frequency with maximum amplitude at a particular angle, the angle being different for each frequency within said frequency spectrum.

WARREN P. MASON.